US 11,775,869 B1

(12) United States Patent
Mishraky (10) Patent No.: US 11,775,869 B1
(45) Date of Patent: Oct. 3, 2023

(54) VALIDATION OF ACCOUNT IDENTIFIER (71) Applicant: Intuit Inc., Mountain View, CA (US)

(72) Inventor: Elhanan Mishraky, Nofim (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/975,358

(22) Filed: Oct. 27, 2022

(51) Int. Cl.
    *G06N 20/00*     (2019.01)

(52) U.S. Cl.
    CPC .................................. *G06N 20/00* (2019.01)

(58) Field of Classification Search
    CPC ............... G06N 20/00; G06F 18/2178; G06F 18/23213; G06F 9/46; G06F 16/1865; G06F 21/6245; G06F 21/31; G06Q 40/02
    See application file for complete search history.

(56) References Cited

U.S. PATENT DOCUMENTS

| | | | |
|---|---|---|---|
| 11,386,408 B2 | 7/2022 | Mishraky et al. | |
| 2014/0051383 A1* | 2/2014 | Doerr | H04M 3/56 455/416 |
| 2016/0232455 A1* | 8/2016 | Carus | G06N 7/01 |
| 2018/0329886 A1* | 11/2018 | Li | G06N 3/08 |
| 2019/0311301 A1* | 10/2019 | Pyati | G06F 16/901 |
| 2020/0020326 A1* | 1/2020 | Srinivasan | G10L 15/1815 |
| 2020/0390399 A1* | 12/2020 | Fee | G16H 50/20 |
| 2021/0182803 A1* | 6/2021 | Mintz | G06N 3/084 |
| 2021/0248610 A1* | 8/2021 | Kurani | G06Q 20/02 |
| 2021/0342740 A1* | 11/2021 | Xu | G06F 16/435 |
| 2022/0318573 A1* | 10/2022 | Smith | G06F 18/2185 |

OTHER PUBLICATIONS

Yijing, "Prediction of cardiac arrest in critically ill patients based on bedside vital signs monitoring", Computer Methods and Programs in Biomedicine 214 Feb. 2022. (Year: 2022).*
Wang, "An extreme gradient boosting technique to estimate TBM penetration rate and prediction platform", Bulletin of Engineering Geology and the Environment, Published online: Jan. 7, 2022. (Year: 2022).*
Rafi, "A Short-Term Load Forecasting Technique Using Extreme Gradient Boosting Algorithm", IEEE, 2021. (Year: 2021).*

(Continued)

*Primary Examiner* — Dave Misir
(74) *Attorney, Agent, or Firm* — Paradice & Li LLP (57) ABSTRACT

Systems and methods for predicting account action failures are disclosed. An example method is performed by one or more processors of a system and includes detecting a character sequence being entered for identifying an account to be used in an account action, extracting a set of subsequences from the character sequence, determining, for the character sequence and each subsequence extracted from the character sequence, a feature value for each of a predefined set of features for characterizing sequences, the determining based on a number of characters included in at least one portion of the character sequence, and generating, using the feature values as input to a model trained in conjunction with a machine learning (ML) algorithm, a predictive value suggestive of a likelihood that the detected character sequence, if submitted, will result in the account action failing.

19 Claims, 5 Drawing Sheets

(56) References Cited

OTHER PUBLICATIONS

Yijing, "Prediction of cardiac arrest in critically ill patients based on bedside vital signs monitoring", Computer Methods and Programs in Biomedicine 214 Feb. 2022. (Previously submitted). (Year: 2022).*

Wang, "An extreme gradient boosting technique to estimate TBM penetration rate and prediction platform", Bulletin of Engineering Geology and the Environment, Published online: Jan. 7, 2022. (Previously submitted). (Year: 2022).*

Rafi, "A Short-Term Load Forecasting Technique Using Extreme Gradient Boosting Algorithm", IEEE, 2021. (Previously submitted). (Year: 2021).*

Ben-Simhon et al., "Automatic Entry Validation Using Density Based Clustering," U.S. Appl. No. 16/502,757, filed Jul. 3, 2019.

Jacobe et al., "Method to Identify Incorrect Account Numbers," U.S. Appl. No. 16/052,086, filed Aug. 1, 2018.

\* cited by examiner

VALIDATION OF ACCOUNT IDENTIFIER

TECHNICAL FIELD

This disclosure relates generally to predicting account action failures, and specifically to training a model and/or using a model trained in conjunction with a machine learning (ML) algorithm to predict whether an account action will fail due to an invalid account identifier.

DESCRIPTION OF RELATED ART

Increasingly, users have used computer-based systems to access and utilize their various accounts, such as phone accounts for establishing digital communications. Generally, to perform an action using their account, users first enter a sequence of characters (e.g., via a user interface) to uniquely identify their account. For example, a user may manage their phone account by entering its unique identifier into an account management interface. As another example, a user may establish a communication link with another user by entering the unique identifier associated with the other user's account into a dialing interface. In some instances, one or more portions of the account identifiers are common among multiple users' accounts. For instance, a same three-character area code may be included in identifiers of phone accounts associated with users residing in a same territory.

However, as account identifiers are often lengthy and appear arbitrary to humans, it is common for users to enter one or more incorrect (or invalid) characters, which can cause the desired account action to fail. For example, a first user may fail to establish a communication link with a second user by entering one incorrect character of the second user's 12-digit account identifier, such as if the mistaken sequence is an invalid account identifier. Furthermore, if the first user's personal records are inaccurate, it may be difficult or impossible for the first user to identify which characters are incorrect. These issues can cause considerable frustration and confusion for users, as well as waste valuable time and resources for all parties involved.

In an effort to detect when account identifiers are entered incorrectly, some conventional systems follow a predefined list of simple rules, such as alerting a user upon detecting that the user has entered an area code that does not appear on a predefined list of valid area codes. However, as technology advances and the number of users (i.e., accounts) grows, the accuracy of such systems decreases rapidly—even with manual intervention—particularly when new identifiers issue or the format of the identifiers changes.

Thus, there is a need for a computer-based system that can quickly and accurately detect when users enter invalid character sequences, such that account actions can be preempted from failing. Furthermore, there is a need for such a computer-based system to automatically adapt when new account identifiers issue and/or when account identifier formats change.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for training a model to predict whether an account action will fail due to an invalid account identifier. An example method is performed by one or more processors of a system and includes retrieving historical data including a plurality of character sequences each entered for identifying an account to be used in an account action, defining a set of features for characterizing sequences, extracting a set of subsequences from each respective character sequence, determining, for each respective character sequence and each subsequence extracted from the respective character sequence, a feature value for each of the defined features based on the historical data and a number of characters included in at least one portion of the respective character sequence, generating model training data based on the feature values and a set of labels assigned to the plurality of character sequences, and training a model, using the model training data in conjunction with a machine learning (ML) algorithm, to generate a predictive value suggestive of a likelihood that a given sequence, if submitted, will result in an account action failure.

Another innovative aspect of the subject matter described in this disclosure can be implemented in a system for training a model to predict whether an account action will fail due to an invalid account identifier. An example system includes one or more processors and a memory storing instructions for execution by the one or more processors. Execution of the instructions causes the system to perform operations including retrieving historical data including a plurality of character sequences each entered for identifying an account to be used in an account action, defining a set of features for characterizing sequences, extracting a set of subsequences from each respective character sequence, determining, for each respective character sequence and each subsequence extracted from the respective character sequence, a feature value for each of the defined features based on the historical data and a number of characters included in at least one portion of the respective character sequence, generating model training data based on the feature values and a set of labels assigned to the plurality of character sequences, and training a model, using the model training data in conjunction with a machine learning (ML) algorithm, to generate a predictive value suggestive of a likelihood that a given sequence, if submitted, will result in an account action failure.

Another innovative aspect of the subject matter described in this disclosure can be implemented as a non-transitory computer-readable medium storing instructions that, when executed by one or more processors of a system for training a model to predict whether an account action will fail due to an invalid account identifier, cause the system to perform operations. Example operations include retrieving historical data including a plurality of character sequences each entered for identifying an account to be used in an account action, defining a set of features for characterizing sequences, extracting a set of subsequences from each respective character sequence, determining, for each respective character sequence and each subsequence extracted from the respective character sequence, a feature value for each of the defined features based on the historical data and a number of characters included in at least one portion of the respective character sequence, generating model training data based on the feature values and a set of labels assigned to the plurality of character sequences, and training a model, using the model training data in conjunction with a machine learning (ML) algorithm, to generate a predictive value suggestive of a likelihood that a given sequence, if submitted, will result in an account action failure.

Another innovative aspect of the subject matter described in this disclosure can be implemented as a method for using a trained model to predict whether an account action will fail due to an invalid account identifier. An example method is performed by one or more processors of a system and includes detecting a character sequence being entered for identifying an account to be used in an account action, extracting a set of subsequences from the character sequence, determining, for the character sequence and each subsequence extracted from the character sequence, a feature value for each of a predefined set of features for characterizing sequences, the determining based on a number of characters included in at least one portion of the character sequence, and generating, using the feature values as input to a model trained in conjunction with a machine learning (ML) algorithm, a predictive value suggestive of a likelihood that the detected character sequence, if submitted, will result in the account action failing.

Another innovative aspect of the subject matter described in this disclosure can be implemented in a system for using a trained model to predict whether an account action will fail due to an invalid account identifier. An example system includes one or more processors and a memory storing instructions for execution by the one or more processors. Execution of the instructions causes the system to perform operations including detecting a character sequence being entered for identifying an account to be used in an account action, extracting a set of subsequences from the character sequence, determining, for the character sequence and each subsequence extracted from the character sequence, a feature value for each of a predefined set of features for characterizing sequences, the determining based on a number of characters included in at least one portion of the character sequence, and generating, using the feature values as input to a model trained in conjunction with a machine learning (ML) algorithm, a predictive value suggestive of a likelihood that the detected character sequence, if submitted, will result in the account action failing.

Another innovative aspect of the subject matter described in this disclosure can be implemented as a non-transitory computer-readable medium storing instructions that, when executed by one or more processors of a system for using a trained model to predict whether an account action will fail due to an invalid account identifier, cause the system to perform operations. Example operations include detecting a character sequence being entered for identifying an account to be used in an account action, extracting a set of subsequences from the character sequence, determining, for the character sequence and each subsequence extracted from the character sequence, a feature value for each of a predefined set of features for characterizing sequences, the determining based on a number of characters included in at least one portion of the character sequence, and generating, using the feature values as input to a model trained in conjunction with a machine learning (ML) algorithm, a predictive value suggestive of a likelihood that the detected character sequence, if submitted, will result in the account action failing.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

As described above, there is a need for a computer-based system that can preempt account actions from failing by quickly and accurately detecting that a user has entered (e.g., via a user interface) one or more inaccurate characters when attempting to enter a unique identifier associated with their account. Although some conventional systems attempt to detect obvious errors by following a predefined list of simple rules, such systems generally decrease in accuracy over time, particularly because they are unable to adapt to changing conditions. Thus, there is further a need for a computer-based system that can adapt to new conditions such as new account identifiers issuing or identifier formats changing. Aspects of the present disclosure recognize that a typical account identifier includes a common "first" portion (e.g., one of a predefined list of area codes, routing numbers, or the like) and a unique "second" portion (e.g., a line number unique to the area code, an account number unique to the routing number, or the like), and that unique portions of account identifiers are generally private or otherwise not readily available to the public. Thus, there is further a need for a computer-based system that can accurately predict a validity of an account identifier including multiple portions, without the need for data that indicates every combination of valid characters for the multiple portions.

Various implementations of the subject matter described in this disclosure provide one or more benefits such as defining features for characterizing sequences, extracting subsequences from sequences, determining feature values for sequences and subsequences, generating model training data, training a model using model training data in conjunction with a machine learning (ML) algorithm, determining a likelihood that a given sequence will result in an account action failure if submitted, and/or generating a prediction in (at least near) real-time with an account identifier being entered. Implementations of the subject matter described in this disclosure also provide one or more benefits such as improving user experience (UX), enhancing workflow, reducing errors, minimizing delay, reducing system processing and memory resources, reducing user time and effort, increasing user satisfaction and retention, reducing confusion and frustration, among other benefits.

For purposes of discussion herein, a "character sequence" (or "sequence") refers to a sequence of characters entered and/or submitted by a user, and a "character subsequence" (or "sequence" or "subsequence") refers to one or more characters or portions of a sequence or subsequence. For purposes of discussion herein, "entering" a sequence refers to a user entering (e.g., via an interface) the characters (e.g., in real-time), and a user "submitting" a sequence refers to the user submitting the entered sequence, such as by pressing Enter, activating a Submit button, or the like.

For purposes of discussion herein, an "account identifier" refers to a sequence of characters assigned to and used for uniquely identifying an account (e.g., a user account) to be used in an account action, where an account may be of any type, and an account identifier may include any number of portions as prefixes, suffixes, or in any other suitable position or positions within the identifier. For instance, an account of a phone number type may be assigned a unique identifier mapped to a hierarchy defined for accounts of a phone number type, and may include a country code portion, an area code portion, an exchange code portion, a line number portion, or any other suitable combination of portions. For another instance, an account of a bank type may be assigned a unique identifier mapped to a hierarchy defined for accounts of a bank type, and may include a routing number portion and an account number portion, for example, where a block of account numbers may be allocated for each routing number, and each account number in a given block may include a set prefix (e.g., 100) followed by a different set of characters for each account (e.g., 1001, 1002, etc.).

For purposes of discussion herein, an "account action" refers to any function that a user may execute in association with a corresponding account, such as logging into the account (e.g., via an account portal), retrieving information (e.g., a secure document) associated with the account, establishing (or initiating) a communication link (e.g., a voice connection) with one or more accounts, executing a transaction (e.g., a payment) using the account, accessing an interface for managing the account, or the like. For purposes of discussion herein, a "successful" action refers to an instance in which a submission of an entered sequence results in the successful occurrence of the corresponding account action (e.g., successfully logging into the account portal, successfully initiating the voice connection, etc.), and a "failed" action refers to the corresponding account action failing (e.g., failing to login to the account portal, failing to initiate the voice connection, etc.).

For purposes of discussion herein, "preempting" a failed action refers at least attempting to prevent a submission of an entered sequence that has been classified as potentially including an invalid account identifier, such as when a predicted likelihood that the sequence, if submitted, will result in the action failing is greater than a threshold likelihood. "Attempting to prevent" submission of the sequence may include initiating any computer-based action that could prevent or deter a user from submitting the sequence, such as a notification, message, image, text box, color, change in interface, cursor position, suggested characters, or the like.

Various implementations of the subject matter disclosed herein provide one or more technical solutions to the technical problem of improving the functionality (e.g., speed, accuracy, etc.) of computer-based systems, where the one or more technical solutions can be practically and practicably applied to improve on existing validation techniques. Implementations of the subject matter disclosed herein provide specific inventive steps describing how desired results are achieved and realize meaningful and significant improvements on existing computer functionality—that is, the performance of computer-based systems operating in the evolving technological field of ML-based validation.

Figure 1:
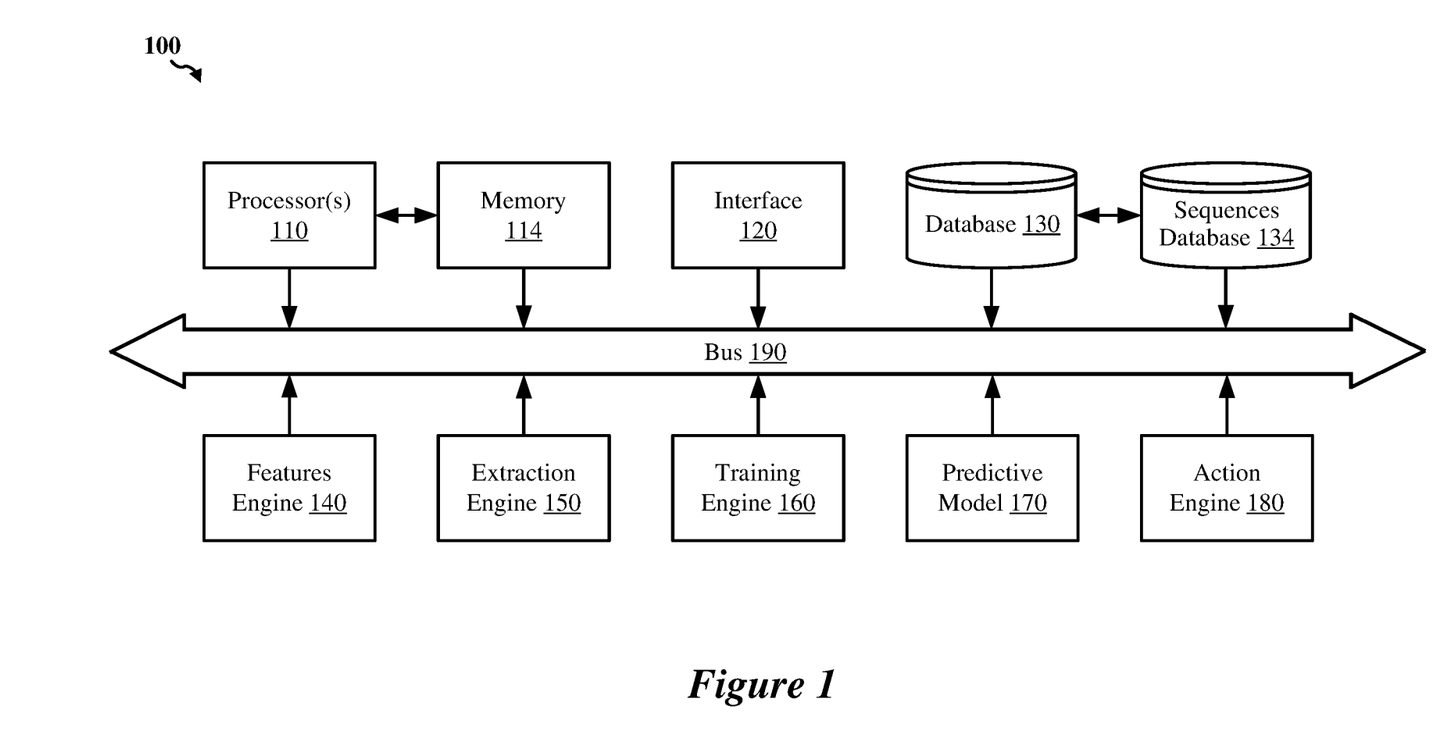
FIG. 1 shows a system, according to some implementations.

FIG. 1 shows a system 100, according to some implementations. Various aspects of the system 100 disclosed herein are generally applicable for predicting whether an account action will fail due to an invalid account identifier, training a model to predict whether an account action will fail due to an invalid account identifier, or both. The system 100 includes a combination of one or more processors 110, a memory 114 coupled to the one or more processors 110, an interface 120, one or more databases 130, a sequences database 134, a features engine 140, an extraction engine 150, a training engine 160, a predictive model 170, and/or an action engine 180. In some implementations, the various components of the system 100 are interconnected by at least a data bus 190. In some other implementations, the various components of the system 100 are interconnected using other suitable signal routing resources. While the system 100 and the examples herein are generally described with reference to validating whether identifiers are valid, aspects of the present disclosure may be used to perform other validation techniques, among other suitable tasks.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for receiving input data and/or instructions from a user, outputting data to a user, presenting information to a user, detecting an action of a user, receiving a command from a user, determining a selection made by a user, prompting a user to perform one or more actions, displaying a cursor to a user, obtaining character sequences from a user, obtaining replacement characters from a user, or the like. In some implementations, the interface 120 is used to provide or receive other suitable information, such as computer code for updating one or more programs stored on the system 100, internet protocol requests and results, or the like. An example interface includes a wired interface or wireless interface to the internet or other means to communicably couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as data objects, sequences, feature values, labels, annotations, training data, validation data, test data, algorithms, loss functions, weights, models, engines, user information, values, ratios, historical data, recent data, current or real-time data, among other suitable information, such as in one or more JavaScript Object Notation (JSON) files or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the sequences database 134 and/or another suitable physical or cloud-based data store. In some implementations, the database 130 includes a relational database capable of presenting information as data sets in tabular form and capable of manipulating the data sets using relational operators.

The sequences database 134 stores data associated with character sequences, such as the sequences themselves, their corresponding subsequences, defined features, feature values, dates, labels, annotations, training sequences, validation sequences, test sequences, weights, ratios, interaction values, or any other suitable data representative of character sequences. In some instances, sequence attributes are stored in a table including a column for each attribute and a row for each sequence. In various implementations, the sequences database 134 is a part of or separate from the database 130. In some instances, the sequences database 134 includes data stored in one or more cloud object storage services, such as one or more Amazon Web Services (AWS)-based Simple Storage Service (S3) buckets. In some implementations, all or a portion of the data is stored in a memory separate from the sequences database 134, such as in the database 130 or another suitable data store.

Some sequences may be formatted according to a top-to-bottom hierarchy defined for a particular type of account, such as a phone number account type, which may include a country code portion (e.g., of varying length) followed by a three-character area code portion followed by a three-character exchange code portion followed by a four-character line number portion. A non-limiting example phone number type sequence is 9724567890123, where 972 is the country code portion, 456 is the area code portion, 789 is the exchange code portion, and 0123 is the line number portion. Another example may be a combination of two or more other portions of the sequence, such as a concatenation of the country code, area code, and exchange code (e.g., 972456789) or a concatenation of the area code and line number (e.g., 7890123). For instance, a non-limiting example phone number type sequence is 9724567890123, where 972456789 is the concatenated country, area, and exchange code ("first") portion, and 0123 is the line number ("second") portion. In some aspects, the country code portion is a unique set of characters assigned (e.g., by the International Organization for Standardization (ISO)) to each unique dialing destination associated with phone number accounts. In this example manner, even if two (or more) phone number accounts share a same area code (e.g., 456), exchange code (e.g., 789), and line number (e.g., 0123), by prepending each sequence with a unique country code portion, the sequences database 134 may differentiate between a first account (e.g., 9724567890123) associated with a first dialing destination (e.g., unique country code 972) and a second phone number account associated with a second dialing destination (e.g., unique country code 1).

The sequences database 134 may be used to store historical data including character sequences each entered for identifying an account to be used in an account action, such as retrieving information associated with the account, establishing a communication link with the account, executing a transaction using the account, accessing an interface for managing the account, or the like. In some instances, each sequence is labeled to indicate whether the corresponding account action succeeded (e.g., a successful login) or failed (e.g., a failure to login). For instance, the labels may be stored in a training data table including a different row for each sequence and a "status" column indicating, for each sequence, whether a corresponding account action was a success or a failure. In some instances, the labels are assigned manually. In some other instances, the labels are assigned automatically, such as an automatic label of "failure" when an activity log indicates that a submitted sequence resulted in a failure to login to the portal, or an automatic label of "success" when the activity log indicates that a submitted sequence resulted in a successful login to the portal. The activity log may be generated locally or obtained from an external source. In some instances, the labels are obtained via reinforcement learning. The table may further indicate, for each respective sequence, a unique ID assigned to the respective sequence and/or a date on which the respective sequence was submitted.

The sequences database 134 may also be used to store one or more other attribute values associated with the character sequences. For example, the sequences database 134 may store a maximum length or number of characters in one or more portions of a sequence, such as a maximum line number length, a maximum country code length, a maximum account number length, and so on. The sequences database 134 may also store a value (e.g., 30, 90, etc.) indicative of a recent time period or window (e.g., 30 days, 90 days, etc.) during which additional character sequences were submitted and used to generate historical features. In some instances, historical features from multiple time windows are stored, and the training engine 160 learns which time windows provide the most accurate predictions and/or one or more optimum combinations of historical features from different time windows. In some of such instances, the training engine 160 periodically (e.g., every day, every week, etc.) determines which time window provides the most accurate predictions. For example, the training engine 160 may determine that, although a particular subsequence is associated with a relatively high rate of success for the most recent 90 days, the rate of success for the particular subsequence is relatively low for the most recent 30 days, and thus, the predictive model 170 may learn to generate a lower likelihood of success for the particular subsequence going forward. In these and other manners, the predictive model 170 may adapt to changing conditions that cause more account actions to fail, such as a format change (e.g., additional prefix characters) for account identifiers of a particular type.

The features engine 140 may be used to define predictive features for characterizing sequences, such as based on the attribute values described above, a combination of features, or any other suitable values stored in the sequences database 134 or derived from characteristics of previously submitted sequences. The features and their corresponding values may be used in training, optimizing, validating, and/or testing the predictive model 170, such that, once trained, the predictive model 170 can determine feature values for a sequence being entered in real-time and predict a likelihood that the sequence will result in a failed account action if submitted.

As non-limiting examples of predictive features, a sequence (or "subsequence") may be characterized based on a number of times the sequence was submitted during a selected time period ("number of submissions"), a number of times the sequence resulted in the corresponding account action succeeding ("number of successful actions"), a number of times the sequence resulted in the corresponding account action failing ("number of failed actions"), a ratio of the number of submissions and the number of successful actions ("success ratio" or "rate of success"), a ratio of the number of submissions and the number of failed actions ("failure ratio" or "rate of failure"), and so on. Other suitable predictive features may be defined. In some implementations, labeled sequences and their feature values are used as input feature segments to a ML algorithm, such that, in conjunction with one or more loss functions, the training engine 160 may be used to determine optimal hyperparameters and/or weights and/or model score impact for the features.

The extraction engine 150 may be used to extract subsequences from submitted sequences. As a non-limiting example, a submitted phone number sequence may be 4567890123 ("full sequence"), where 456 is an area code, 789 is an exchange code, and 0123 is a line number, where a concatenation of the area code and exchange code (456789) is considered a "first portion" and the line number (0123) is considered a "second portion." In some implementations, the extraction engine 150 extracts a number of subsequences equal to a number of characters (k) in the second portion, where k=4 for this example, and where each subsequence includes each of the characters of the first portion and a different set of characters from the second portion. For this example, the extraction engine 150 may extract four subsequences from the full sequence (k=0), and trim the last character of each successive sequence, such that the extracted subsequences include 456789012 (k=1), 45678901 (k=2), 4567890 (k=3), and 456789 (k=4). It is noted that the final subsequence (k=4) is equal to the first portion.

The extraction engine 150 may also be used to pad ones of the sequences according to a defined format. For instance, a "first portion" of sequences for a particular account type may be assigned a "maximum first portion length" (e.g., nine characters), and the extraction engine 150 may left pad (e.g., with zeroes) any of such sequences that are submitted with a "first portion" less than the maximum length. In this manner, the extraction engine 150 formats sequences submitted for the particular account type to have a same length, such that character positions are in alignment across all first portions. As a non-limiting example, a concatenated sequence submitted for the particular account type may be 472934745634563132 ("full sequence"), where 4729347 is a 7-character "first portion" and 45634563132 is an 11-character "second portion." For this example, if the maximum length of the first portion for the particular account type is nine characters, the extraction engine 150 may left pad the first portion with two zeroes such that it becomes 004729347 ("padded first portion"), and the resultant concatenation becomes 00472934745634563132.

The extraction engine 150 may also be used to generate groups of sequences and subsequences having identical values. For instance, the extraction engine 150 may store hundreds of thousands of subsequences extracted from tens of thousands of full sequences, and generate a group for each set of sequences that have identical values, where each sequence in each sequence group has a same number of characters in the "second portion." For the non-limiting example above, the padded first portion (004729347) fits the 9-character max length for the particular account type, and the second portion (45634563132) has an 11-character "second portion length." Thus, in generating the subsequences, the extraction engine 150 may concatenate the padded first portion with the second portion ("padded full sequence," i.e., k=0), and generate a set of subsequences from the padded full sequence, including 00472934745634563132 (k=1), 004729347456345631 (k=2), 00472934745634563 (k=3), 0047293474563456 (k=4), 004729347456345 (k=5), 00472934745634 (k=6), 0047293474563 (k=7), 004729347456 (k=8), 00472934745 (k=9), 0047293474 (k=10), and 004729347 (k=11), where it is noted that the final subsequence (k=11) is equal to the padded first portion (004729347). Each of the sequences and subsequences may be stored in the training data table and grouped with previously stored sequences and subsequences having a same value.

The extraction engine 150 may also be used to determine feature values for each sequence group, such as based on the historical data associated with a selected time period (p). For the non-limiting example above, the extraction engine 150 may determine that subsequence group 004729347456 is associated with 4000 unique submissions from the most recent 90 days (p=90), that 3600 of the submissions resulted in a successful action (e.g., successfully logging in), that 400 of the submissions resulted in a failed action (e.g., a failure to login), and thus determine that, for the most recent 90 days, subsequence 004729347456 had a success ratio of 90% and a failure ratio of 10%. The extraction engine 150 may repeat this process for each group—that is, generate, for each sequence group, a corresponding number of submissions, number of successful actions, number of failed actions, success ratio, and failure ratio during the selected time period, and store the values for further processing, such as for training, validating, and/or testing the predictive model 170, and/or for using the predictive model 170 to generate a prediction in real-time with a sequence being entered. In some instances, the extraction engine 150 generates the failure ratio and refrains from generating the success ratio. In some other instances, the extraction engine 150 stores at least one of the particular account type, the maximum first portion length, the actual second portion length, and/or the selected time period for the corresponding group of sequences. Fewer, additional, and/or different suitable values may be generated and/or stored.

The training engine 160 may be used to generate model training data based on the features and the labeled sequences, and the model training data may be used to generate, optimize, train, and/or validate the predictive model 170, such that the predictive model 170 can (more) accurately predict whether a sequence will result in a failed account action. In this manner, the trained model may provide various technical benefits, such as accurately identifying an invalid account identifier (e.g., in real-time), preempting a user from submitting an invalid account identifier, successfully preventing an account action from failing, among other benefits. The training engine 160 may also be used to enhance the model training data, such as based on one or more additional sequences periodically obtained (e.g., once per day, per week, etc.), processed in the manners described herein, and incorporated into the model training data. For example, the training engine 160 may store one or more characteristics associated with the additional sequences and subsequences (e.g., a number of submissions associated with the sequence, a number of failed account actions associated with the sequence, or the like), and map unique keys to the additional sequences and subsequences (or one or more portions or characteristics of the (sub) sequences) in an index to be accessed in real-time with a sequence being entered in the future, as further described in connection with the predictive model 170. In some implementations, the unique keys are based on a length of each "second portion" (or number of trimmed characters, "k") in each group. As a non-limiting example, a first unique key for a first group may be '10' when the second portion includes 10 characters, a second unique key for a second group may be '3' when the second portion includes 3 characters, and the index may be used to differentiate between a first subsequence (e.g., '100') from the first group (e.g., when k=7) and a second subsequence (e.g., '100') from the second group (e.g., when k=0). As another non-limiting example, a first unique key may be '1' when 1 character (e.g., k=1) is trimmed from a 4-character second portion for a first group, a second unique key may be '2' when 2 characters (e.g., k=2) are trimmed from a 5-character second portion for a second group, and the index may be used to differentiate between a first subsequence (e.g., '100') from the first group (e.g., when the second portion is '1004') and a second subsequence (e.g., '100') from the second group (e.g., when the second portion is '10042'). In these and other manners, the system 100 refrains from determining features (e.g., a rate of success) for a (sub)sequence in a first group based on features determined for a same (sub)sequence in a second group (e.g., a high rate of success), even when the first and second (sub)sequences are the same.

In some implementations, upon obtaining a set of additional sequences, the extraction engine 150 concatenates a "first portion" of each sequence with a "second portion" of the sequence. If a type of the associated account has a maximum first portion length (e.g., nine characters), the extraction engine 150 may pad (e.g., with zeroes) ones of the first portions until each first portion includes a number of characters equal to the maximum first portion length. Thereafter, the extraction engine 150 may extract, from each sequence, a number of subsequences equal to a number of characters in the second portion. In some instances, the extraction engine 150 trims the final character from each successive subsequence such that each subsequence includes all of the characters of the first portion and a progressively fewer number of characters from the second portion. Thereafter, the extraction engine 150 may group ones of the (sub)sequences having identical values, determine a number of (sub)sequences in each group, and then determine feature values (e.g., a number of failed actions) for each (sub)sequence in each group. The extraction engine 150 may generate an index mapping a unique key to each sequence group based on its corresponding "second portion" length (or number of trimmed characters, "k"), and may provide the index, additional sequences, and/or feature values to the training engine 160 for further training and/or to the predictive model 170 for validating a sequence in real-time.

In addition, or in the alternative, upon obtaining the additional sequences, the extraction engine 150 may concatenate the first portion and second portion of each sequence, group sequences having identical first portions, filter duplicates from each group, and extract progressively trimmed subsequences from each group in the manners described above. Thereafter, the extraction engine 150 may group subsequences having identical first portions, determine a "first value" indicative of a number of instances that the first portion of each sequence group appears in the historical data (e.g., a number of times the first portion was previously submitted), and determine, for each number of trimmed characters ("k"), a "second value" indicative of a number of unique subsequences in each sequence group (e.g., a number of unique, previously submitted second portions that included the first portion). Thereafter, the extraction engine 150 may determine, for each group, and for each "k", a ratio of the first value and the second value (a "variance ratio"), and provide the variance ratios to the training engine 160 for further processing. In these and other manners, the training engine 160 may train the predictive model 170 to apply relatively higher weights to values generated based on first portions associated with lower variance, and apply relatively lower weights to values generated based on first portions associated with higher variance—and thus, generate meaningful training data from sequences even when their corresponding first portions are associated with randomly assigned (i.e., greatly varying) "second portion" prefixes.

Upon generating and/or obtaining the training data, the training engine 160 may use the training data in conjunction with a machine learning (ML) algorithm to generate, train, optimize, validate, and/or test a predictive model (e.g., the predictive model 170) such that the predictive model 170 can accurately predict, in at least near-real time with a sequence being entered, whether the sequence, if submitted, will result in an account action failure. For instance, the training engine 160 may recursively and/or iteratively increase an accuracy of the predictions by obtaining and extracting subsequences from (additional) sequences, generating predictions based on the sequences' features values, comparing the predictions with labels indicating whether the account actions failed, generating enhanced training data based on an accuracy of the predictions, and using the enhanced training data to improve an accuracy of predictions generated by the predictive model 170. In some implementations, the training engine 160 uses one or more loss functions to determine optimum weighting factors for each sequence feature in the training data, and uses the validation data to optimize one or more hyperparameters used by the predictive model 170 in generating the predictions. In some aspects, the training engine 160 repeats this process until the predictions generated by the predictive model 170 are at least as accurate as a desired threshold. The training engine 160 may also repeatedly train the predictive model 170 until a confidence associated with the generated predictions is greater than a confidence threshold. In these and other manners, the predictive model 170 may be transformed into an even more effective tool for validating account identifiers.

In some implementations, the training engine 160 generates the predictive model 170 such that it incorporates one or more aspects of an extreme gradient boosting (xgboost) model or another suitable model for relatively quickly processing relatively large amounts of tabular data, such as a random forest model, a (gradient boosted) decision tree, or the like. In this manner, the predictive model 170 may generate predictions in at least near real-time with a character sequence being entered. In addition, or in the alternative, the predictive model 170 may incorporate one or more aspects of, for example, logistic regression, nearest neighbors, classification trees, control flow graphs, a genetic algorithm (GA), an evolutionary algorithm (EA), a stochastic gradient descent (SGD) technique, a simulated annealing technique, another suitable search optimization technique, support vector machines, naïve Bayes, Bayesian Networks, value sets, hidden Markov models, or neural networks configured to generate predictions for the intended purpose. In some aspects, the predictive model 170 incorporates aspects of a neural network of a suitable type, such as a feedforward neural network, a recurrent neural network, a deep neural network (DNN), or another suitable architecture. In some instances, the training engine 160 and/or the adaptation engine 158 may conserve time and resources when training the predictive model 170, such as by incorporating one or more aspects of a gradient boosting model, such as Light Gradient Boosting Machine (LightGBM). In some other implementations, the predictive model 170 incorporates aspects of a forecasting model such that the predictive values are generated based on previous values of the input features, including interaction input features. Example forecasting models include one or more of an autoregressive (AR) model or a window function. Example AR models for predicting values from time series data include an autoregressive integrated moving average (ARIMA) model, Fakebook's Prophet model, or an exponential smoothing model. Example window functions include a simplified moving average, an exponential moving average, stochastic based smoothing, or a naive forecasting model. Predictions by an example window function may be based on one or more of a mean, a minimum, or a maximum of a predefined number of values in a time series data preceding a predicted value. It is to be understood that the predictive model 170 may incorporate aspects of any number of classification or regression models, and is not limited to the provided examples or a particular model type.

Once trained, the predictive model 170 may be used to predict whether an account action will fail if an entered sequence is submitted. To that end, the predictive model 170 may obtain a character sequence being entered (e.g., via the interface 120) in real-time for identifying an account of a particular account type. As a non-limiting example, the character sequence may be 228163264 | 6432168421, where 228163264 is for identifying a "first portion" of the account's identifier, and 6432168421 is for identifying a "second portion" of the account's identifier. For this example, the predictive model 170 determines (e.g., based on the historical data for the particular account type) that the first portion is associated with a maximum number of characters (e.g., 12), and thus, the nine-character first portion is left padded (e.g., with zeroes) to fit the maximum number of characters, i.e., 000248163264. In some implementations, the padded first portion is then concatenated with the second portion (for a resultant sequence of 000248163264643216842), a list of features is generated for characterizing the resultant sequence, and a set of subsequences is extracted from the resultant sequence, such as in the manners described above. For this example, as the number of characters in the second portion (6432168421) is 10, 10 subsequences may be extracted from the resultant sequence, where each successive subsequence includes all of the characters of the padded first portion and trims the trailing character of the previous subsequence, i.e., 000248163264643216842 ("s1"), 00024816326464321684 ("s2"), 0002481632646432168 ("s3"), 000248163264643216 ("s4"), 00024816326464321 ("s5"), 0002481632646432 ("s6"), 000248163264643 ("s7"), 00024816326464 ("s8"), 0002481632646 ("s9"), and 000248163264 ("s10"). In some instances, one or more of the sequences are hashed in the index, such as for security purposes.

The predictive model 170 may also be used to determine feature values for the sequences, such as in the manners described above. In some instances, the feature values are stored in the list of features. The predictive model 170 may determine the feature values based in part on previously stored values, such as the periodically stored (e.g., once per day, per week, etc.) feature values determined for previously submitted sequences (and their subsequences) also mapped in the index. By relating the sequences in the index, the predictive model 170 may refrain from processing already processed sequences such that predictive values may be generated in at least near real-time with a sequence being entered. Thus, upon obtaining a set of sequences (e.g., s0-s10), the predictive model 170 may attempt to match each sequence to an identical (previously submitted) sequence in the index. For this example, s4-s10 each have a matching entry in the index, and s0-s3 each do not. Thus, the predictive model 170 may retrieve a most recently stored value for "number of submissions" and "number of failures" for each of s4-s10. In some instances, the retrieved values are added to the list of features. For this example, the retrieved values indicate that s4 is associated with 24 submissions and 24 failures, s5 with 500 submissions and 120 failures, and so on for s6 (4600 submissions | 510 failures), s7 (42800 | 5260), s8 (224532 | 24680), s9 (4124840 | 2820), and s10 (42864210 | 2276840). The retrieved feature values may be stored in the list of features.

It is noted that the number of submissions increases as characters are trimmed from the subsequences. For example, s4 (000248163264643216) has been submitted 24 times, and s5 (00024816326464321)—which is the same as s4 with the trailing character trimmed—has been submitted 500 times. In other words, sequences including s5 have been submitted 500 times, and 24 of said sequences also included s4 (while 476 did not). It is also noted that the number of failures increases as characters are trimmed from the subsequences. It is to be understood that the increase in the number of failures cannot be greater than the increase in the number of submissions, and that the number of failures for a sequence cannot be greater than its number of submissions. For example, 24 of the 24 submissions of s4 resulted in a failed action, and 120 of the 500 submissions of s5 resulted in a failed action. Thus, of the 500 times s5 was submitted, if the character immediately following s5 was '6' (i.e., the last character of s4), the account action failed, regardless of whether one or more characters followed s4. For this example, since none of the sequences in the index match s3, of the 24 times s4 was submitted, s4 was either the last character of the submitted sequence or was followed by a character other than '8' (i.e., the last character of s3). Furthermore, the number of submissions associated with successive sequences generally increases exponentially due to an exponential increase in the number of characters that can potentially follow the next trimmed sequence.

Upon obtaining the previously stored feature values for the set of sequences (e.g., the "number of submissions" and "number of failures" for each of s0-s10), the predictive model 170 may generate one or more additional feature values for one or more of s0-s10. For the non-limiting example above, the predictive model 170 determines a "number of successes" for each of s4-s10 based on a difference between its corresponding "number of submissions" and "number of failures." In some instances, the predictive model 170 determines a "success ratio" for each of s4-s10 based on dividing its corresponding "number of successes" by its "number of submissions," and/or a "failure ratio" for each of s4-s10 based on dividing its corresponding "number of failures" by its "number of submissions." The generated feature values may be stored in the list of features.

Thereafter, the predictive model 170 may use the retrieved and generated feature values as inputs for its trained algorithm to predict a probability that the sequence of characters is invalid—that is, to generate a "failure score" (or "model score") suggestive of a likelihood that the sequence of characters, if submitted, will result in the account action failing due to an invalid account identifier. For this example, as no previous submissions have included s0 (much less s1, s2, or s3), and s4 has always resulted in failure, the predictive model 170 is likely to generate a failure score suggestive of a high likelihood that s0 is an invalid account identifier. In some instances, the predictive model 170 provides the failure score (or predicted likelihood or predictive value) to the action engine 180 for further processing. In some other instances, the predictive model 170 provides one or more processed sequences to the sequences database 134 or the training engine 160 for further training, where the sequences are annotated to indicate the predictive value generated for the sequence or one or more actual results, such as whether the sequence was changed, whether the sequence was submitted, whether the account action failed, whether a preemptive action was performed, whether input was received from the user, or the like.

The action engine 180 may be used to classify the entered sequence as "at-risk" (e.g., of causing the account action to fail) or "not at-risk" (e.g., of causing the account action to fail). For example, the action engine 180 may classify the sequence as at-risk if the predictive value is greater than a threshold, and as not at-risk if the predictive value is not greater than the threshold. In some implementations, the threshold is 0.5, such as to indicate that an at-risk sequence is more likely than not to cause the account action to fail, and vice versa. In some other implementations, the threshold may be a lower value, thus classifying relatively more sequences as at-risk, or the threshold may be a higher value, thus classifying relatively fewer sequences as at-risk. In some other implementations, the threshold may dynamically change based on system resources. For example, if the action engine 180 determines that a number of users greater than a value are concurrently using the system 100, the action engine 180 may increase the threshold.

The action engine 180 may also be used to perform one or more actions based on the classification. For example, the action engine 180 may selectively perform one or more preemptive actions in an attempt to prevent a sequence from being submitted if the sequence is classified as at-risk, and may refrain from performing one or more preemptive actions if the sequence is classified as not at-risk. An example preemptive action includes generating a notification that the entered sequence is likely invalid and displaying the notification to a user entering the sequence, such as via the interface 120. Another example preemptive action includes generating a suggestion (e.g., for the user) to verify whether the character sequence is correct. Yet another example preemptive action includes generating a request for a replacement character sequence (e.g., from the user).

In some implementations, upon determining that the predictive value is greater than a threshold, the predictive model 170 may be used to predict an initial position in the entered sequence where a first incorrect or invalid character was entered, and the action engine 180 may be used to generate an indication (e.g., for the user) of said initial position, such as if a certainty of the prediction is greater than a certainty threshold. For instance, the predictive model 170 may first determine a maximum length of a second portion of the entered sequence. For the non-limiting example described above, the length of the second portion (6432168421) is 10 characters. Thereafter, the index may be used to validate the entered sequence one character at a time where, rather than validating the subsequences in order of decreasing length, the subsequences are validated in order of increasing length beginning with the final character ('4') of the first portion (228163264).

For this example, s10 (228163264)—which is the same as the first portion—is validated first to determine its associated "number of successes," such as based on its previously determined "number of submissions" and "number of failures." In this manner, the predictive model 170 avoids wasting time and resources validating individual subsequences of the first portion, such as if the first portion represents a non-unique, relatively common (or standard or predefined) identifier for accounts of the particular account type, e.g., a common country code, area code, routing number, username, or the like. If the number of successes for s10 is zero, the predictive model 170 may predict that s10 (i.e., the first portion) is an invalid account identifier and, for example, notify the user that the first portion is potentially invalid. By determining that the first portion is valid before analyzing longer sequences (e.g., including one or more characters of the second portion), the predictive model 170 also avoids wasting time and resources validating the longer sequences and can provide a prediction of a precise location in the entered sequence where the initial mistaken character was entered. Otherwise, if the number of successes for s10 is greater than 0 (i.e., at least one previous submission including s10 resulted in a successful action), the predictive model 170 may instead determine that s10 is valid and then proceed to validate s9.

Thus, for this example, the predictive model 170 retrieves s9 (2481632646)—which is the same as s10 with a '6' at the end—and determines its associated number of successes. If the number of successes is zero, the predictive model 170 may predict that s9 is invalid. Since the predictive model 170 has already predicted that s10 is valid, the predictive model 170 may also predict that the last character of s9 ('6') is the position in the entered sequence where an initial incorrect character was entered. The action engine 180 may indicate the prediction to the user (e.g., via the interface 120), such as by placing a cursor on or highlighting the '6', for example. Otherwise, if the number of successes associated with s9 is greater than zero, as in this example, the predictive model 170 may determine that s9 is valid, proceed to validate s8, and so on.

Upon identifying a first subsequence associated with a number of successes equal to zero, the predictive model 170 may refrain from validating the remaining subsequences. For this example, the predictive model 170 determines, in order, that s10, s9, s8, s7, s6, and s5 are each associated with at least one submission that resulted in a successful account action, and then determines that the number of successes associated with s4 is zero (e.g., 24 submissions–24 failures=0 successes). Thus, the predictive model 170 predicts that s4 is invalid, and refrains from validating s3, s2, s1, and s0. Thereafter, the action engine 180 may, for example, place a cursor on or highlight the final character of s4 and/or request that the user validate the sequence starting from that position. In this manner, the system 100 uses the sequence feature values to predict that the entered sequence is invalid, as well as to identify and indicate a position within the entered sequence where an initial incorrect or invalid character is predicted to have been entered.

The features engine 140, the extraction engine 150, the training engine 160, the predictive model 170, and/or the action engine 180 are implemented in software, hardware, or a combination thereof. In some implementations, any one or more of the features engine 140, the extraction engine 150, the training engine 160, the predictive model 170, or the action engine 180 is embodied in instructions that, when executed by the processor 110, cause the system 100 to perform operations. In various implementations, the instructions of one or more of said components, the interface 120, and/or the sequences database 134, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples of predicting whether an account action will fail due to an invalid account identifier and/or training a model to predict whether an account action will fail due to an invalid account identifier are described with reference to the system 100, other suitable system configurations may be used.

Figure 2:
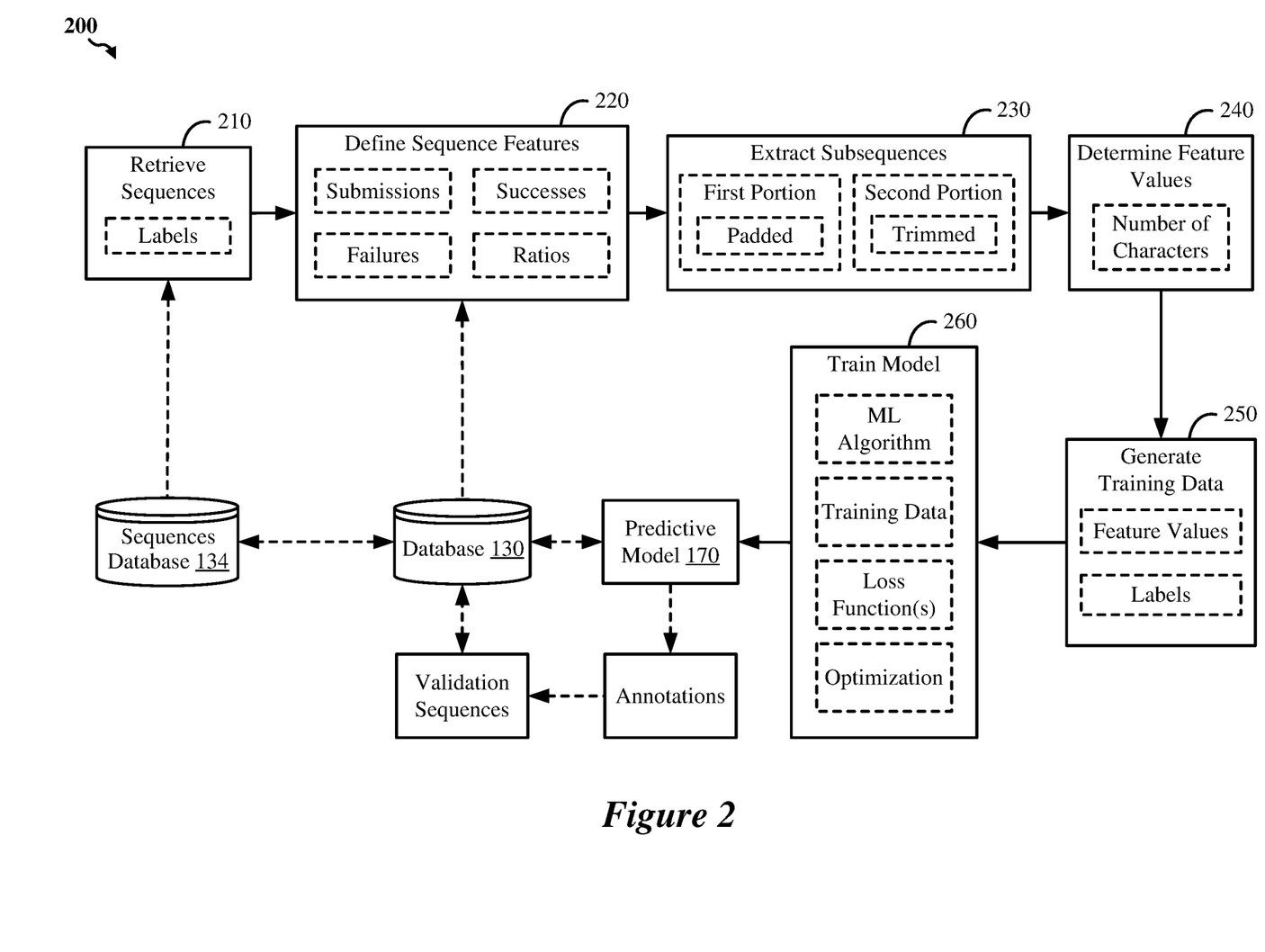
FIG. 2 shows a high-level overview of an example process flow employed by a system, according to some implementations.

FIG. 2 shows a high-level overview of an example process flow 200 employed by a system, according to some implementations, during which a model (e.g., the predictive model 170) is trained to predict whether an account action will fail due to an invalid account identifier. In various implementations, the system incorporates one or more (or all) aspects of the system 100. In some implementations, various aspects described with respect to FIG. 1 are not incorporated, such as the action engine 180.

At block 210, the system 100 retrieves historical data including a plurality of character sequences each entered for identifying an account to be used in an account action. The plurality of character sequences may be obtained from the sequences database 134 and/or the database 130. The plurality of character sequences may be labeled to indicate whether the account action failed. The account action may include at least one of retrieving information associated with the account, establishing a communication link with the account, executing a transaction using the account, accessing an interface for managing the account, or another suitable account action that could fail due to an invalid account identifier.

At block 220, the system 100 defines a set of features for characterizing sequences. The features may be used for characterizing a sequence based on at least one of a number of submissions associated with the sequence, a number of successful actions associated with the sequence, a number of failed actions associated with the sequence, a success ratio associated with the sequence, or a failure ratio associated with the sequence.

At block 230, the system 100 extracts a set of subsequences from each respective character sequence. Each character sequence may include at least a first portion and a second portion. In some implementations, one or more of the subsequences include a padded version of the first portion, such as one or more zeroes inserted before the first portion. In some other implementations, one or more of the subsequences include a trimmed version of the second portion, such as with one or more characters removed from the end of the second portion. Detailed examples are described in connection with FIG. 1.

At block 240, the system 100 determines, for each respective character sequence and each subsequence extracted from the respective character sequence, a feature value for each of the defined features based on the historical data and a number of characters included in at least one portion of the respective character sequence. The feature values may be determined for a sequence based on at least one of the number of submissions associated with the sequence, the number of successful actions associated with the sequence, the number of failed actions associated with the sequence, the success ratio associated with the sequence, or the failure ratio associated with the sequence.

At block 250, the system 100 generates model training data based on the feature values and the labels assigned to the plurality of character sequences. The model training data may be used for generating, training, validating, optimizing, testing, or otherwise augmenting the predictive model 170 such that it can generate (more) accurate predictions.

At block 260, the system 100 generates, trains, and/or further trains the predictive model 170 using the model training data in conjunction with a machine learning (ML) algorithm. In some aspects, one or more loss functions are used to optimize hyperparameters used by the predictive model 170 in generating predictions. Once trained, the predictive model 170 is used to generate a predictive value suggestive of a likelihood that a given sequence, if submitted, will result in an account action failure. In some instances, the ML algorithm incorporates one or more aspects of an xgboost model.

In some implementations, after block 260, the system 100 obtains one or more validation sequences annotated to indicate at least one of whether an associated character sequence was submitted or whether an associated account action failed, and provides the annotated sequences to the database 130 and/or the sequences database 134 for further training. The feature values generated during prediction training and/or real-time prediction may be stored in the database 130 and/or the sequences database 134 for use in subsequent training and/or subsequent real-time prediction.

Figure 3:
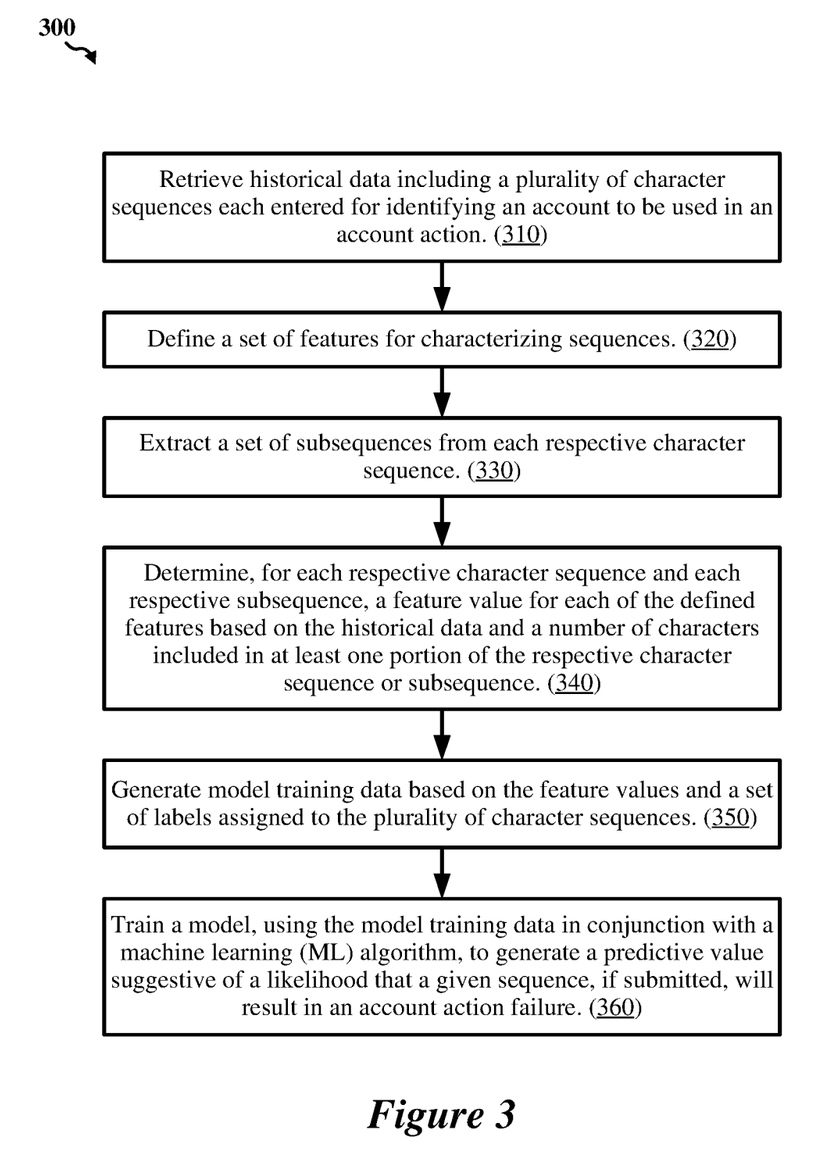
FIG. 3 shows an illustrative flowchart depicting an example operation for training a model to predict whether an account action will fail due to an invalid account identifier, according to some implementations.

FIG. 3 shows a high-level overview of an example process flow 300 employed by the system 100 of FIG. 1 and/or the system described with respect to FIG. 2, according to some implementations, during which a model is trained to predict whether an account action will fail due to an invalid account identifier. At block 310, the system 100 retrieves historical data including a plurality of character sequences each entered for identifying an account to be used in an account action. At block 320, the system 100 defines a set of features for characterizing sequences. At block 330, the system 100 extracts a set of subsequences from each respective character sequence. At block 340, the system 100 determines, for each respective character sequence and each subsequence extracted from the respective character sequence, a feature value for each of the defined features based on the historical data and a number of characters included in at least one portion of the respective character sequence. At block 350, the system 100 generates model training data based on the feature values and a set of labels assigned to the plurality of character sequences. At block 360, the system 100 trains a model, using the model training data in conjunction with a machine learning (ML) algorithm, to generate a predictive value suggestive of a likelihood that a given sequence, if submitted, will result in an account action failure.

Figure 4:
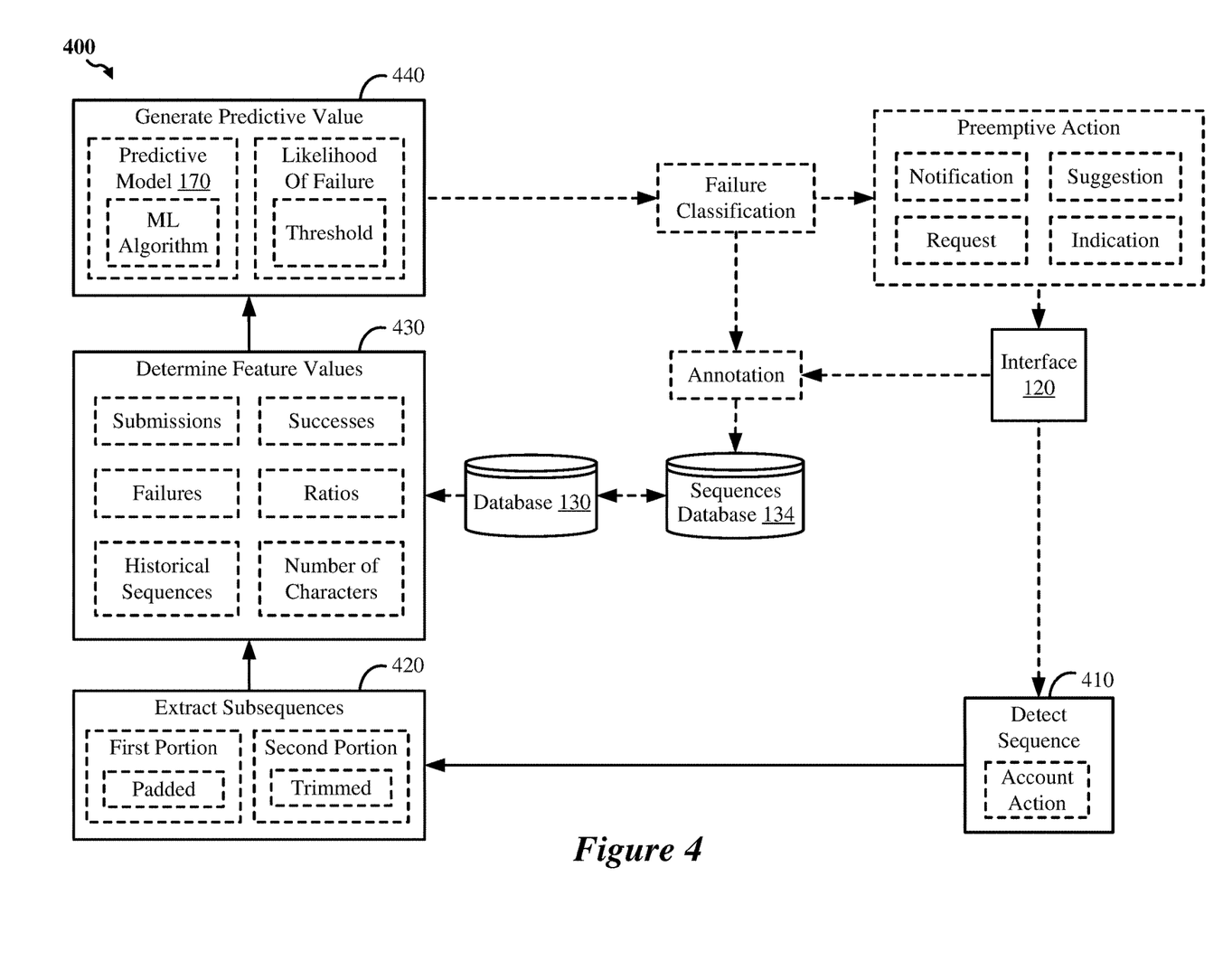
FIG. 4 shows a high-level overview of an example process flow employed by a system, according to some implementations.

FIG. 4 shows a high-level overview of an example process flow 400 employed by a system, according to some implementations, during which a trained model (e.g., the trained predictive model 170) is used to predict whether an account action will fail due to an invalid account identifier. In various implementations, the system incorporates one or more (or all) aspects of the system 100. In some implementations, various aspects described with respect to FIG. 1 are not incorporated, such as the features engine 140, the training engine 160, and/or the action engine 180.

At block 410, the system 100 detects a character sequence being entered for identifying an account to be used in an account action. The character sequence may be being entered via the interface 120, such as by a user. The account action may include at least one of retrieving information associated with the account, establishing a communication link with the account, executing a transaction using the account, accessing an interface for managing the account, or another suitable account action that could fail due to an invalid account identifier.

At block 420, the system 100 extracts a set of subsequences from the character sequence, where the character sequence includes at least a first portion and a second portion each representing a different attribute of the account. In some implementations, one or more of the subsequences includes a padded version of the first portion, such as one or more zeroes inserted before the first portion. In some other implementations, one or more of the subsequences includes a trimmed version of the second portion, such as with one or more characters removed from the end of the second portion. In some instances, the account is of a particular type, and an order of the portions maps to a hierarchy defined for accounts of the particular type. For instance, the first portion may map to a top level of the hierarchy used for grouping ones of the accounts sharing a first attribute, and the second portion may map to a bottom level of the hierarchy used for uniquely identifying accounts within the corresponding group. Detailed examples are described in connection with FIG. 1.

At block 430, the system 100 determines, for the character sequence and each subsequence extracted from the character sequence, a feature value for each of a predefined set of features for characterizing sequences, the determining based on a number of characters included in at least one portion of the character sequence. For instance, the feature values may be determined based on feature values previously determined for identical sequences, such as based on historical data or a set of additional sequences obtained and processed on a periodic basis. The previously stored feature values may include at least one of a number of submissions, a number of successful actions, a number of failed actions, a success ratio, or a failure ratio associated with the sequence. In some instances, the system 100 determines one or more of the feature values in real-time, such as based on an interaction between one or more of the previously stored feature values. The feature values may be obtained from a database, such as the database 130 and/or the sequences database 134.

At block 440, the system 100 generates, using the feature values as input to a model trained in conjunction with a machine learning (ML) algorithm (e.g., the trained predictive model 170), a predictive value suggestive of a likelihood that the detected character sequence, if submitted, will result in the account action failing. The predictive value may be generated in real-time with the sequence being entered.

In some implementations, after block 440, the system 100 compares the predictive value with a threshold, and classifies the detected sequence as at-risk if the predictive value is greater than the threshold, and classifies the detected sequence as not-at-risk if the predictive value is not greater than the threshold. In some instances, when the detected sequence is classified as at-risk, the system 100 performs one or more preemptive actions in an attempt to prevent submission of the detected sequence. The one or more preemptive actions may include at least one of generating a notification that the detected sequence is likely invalid, generating a suggestion to verify whether the detected sequence is correct, generating a request for a replacement character sequence, or predicting an initial position in the detected sequence where an incorrect character was first entered and/or generating an indication of the predicted initial position. One or more of the notification, suggestion, request, or indication may be provided to a user via a user interface, such as the interface 120. In some instances, the classified sequence is annotated based on at least one of whether the sequence was submitted or whether the associated account action failed. The annotated sequence may be provided to a database, such as one or more of the sequences database 134 or database 130, for further processing and/or training.

Figure 5:
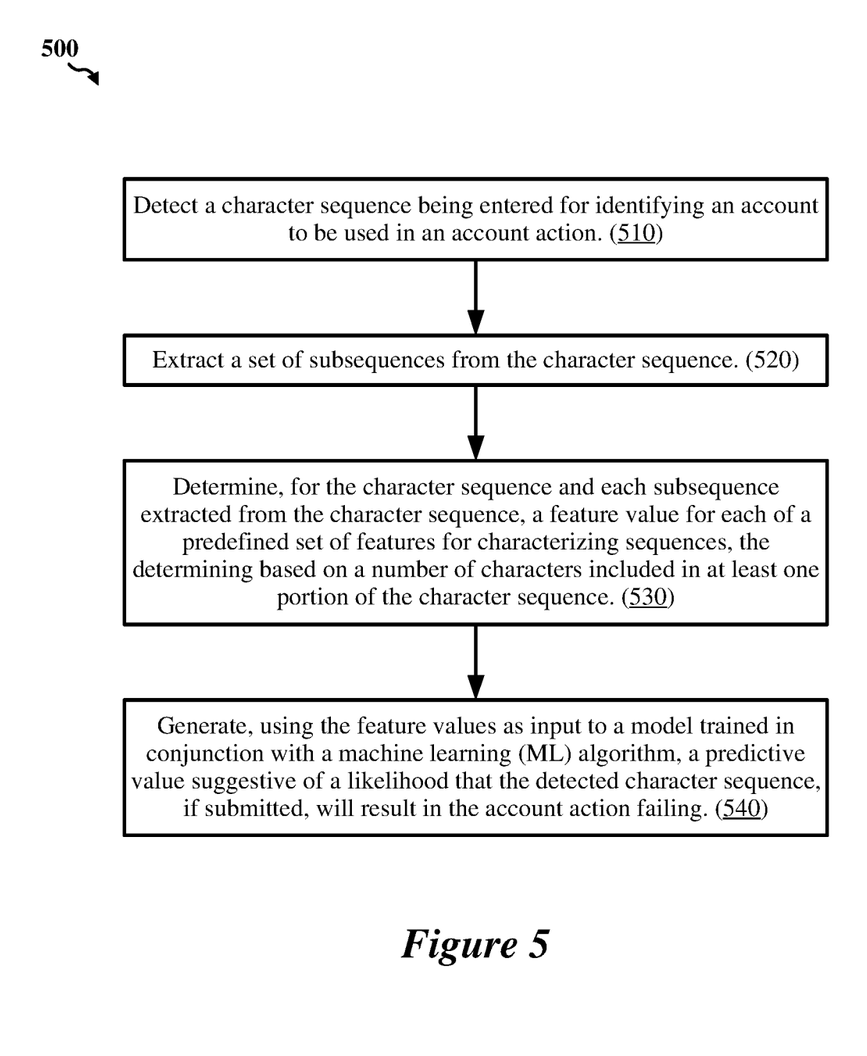
FIG. 5 shows an illustrative flowchart depicting an example operation for using a trained model to predict whether an account action will fail due to an invalid account identifier, according to some implementations.

FIG. 5 shows a high-level overview of an example process flow 500 employed by the system 100 of FIG. 1 and/or the system described with respect to FIG. 4, according to some implementations, during which a trained model predicts whether an account action will fail due to an invalid account identifier. At block 510, the system 100 detects a character sequence being entered for identifying an account to be used in an account action. At block 520, the system 100 extracts a set of subsequences from the character sequence. At block 530, the system 100 determines, for the character sequence and each subsequence extracted from the character sequence, a feature value for each of a predefined set of features for characterizing sequences, the determining based on a number of characters included in at least one portion of the character sequence. At block 540, the system 100 generates, using the feature values as input to a model trained in conjunction with a machine learning (ML) algorithm, a predictive value suggestive of a likelihood that the detected character sequence, if submitted, will result in the account action failing.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other suitable configuration. In some implementations, particular processes and methods are performed by circuitry specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification can also be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or in the alternative, a depicted operation may be split into multiple operations, or multiple operations that are depicted may be combined into a single operation. Thus, the claims are not intended to be limited to the implementations shown herein but are to be accorded the widest scope consistent with this disclosure and the principles and novel features disclosed herein.

What is claimed is:

1. A method for training a model to predict whether an account action will fail due to an invalid account identifier, the method performed by one or more processors of a validation system and comprising:
   retrieving historical data including a plurality of character sequences each entered for identifying an account to be used in the account action, each character sequence including at least a first portion;
   grouping the character sequences based on the first portions;
   extracting a set of trimmed subsequences from each respective group of character sequences, each trimmed subsequence having a number of trimmed characters;
   grouping ones of the trimmed subsequences based on the numbers of trimmed characters;
   determining, for each first portion, for each group of trimmed subsequences, a ratio of a number of unique subsequences included in the group of trimmed subsequences to a total number of instances the corresponding first portion is used in the historical data;
   determining, for each respective character sequence and each subsequence extracted from the respective character sequence, a feature value for each of a set of features defined for characterizing sequences, the determining based on the historical data, a number of characters included in at least one portion of the respective character sequence, the determined ratios, and sequences of characters submitted during one or more recent time periods during which the detected character sequence was submitted; and
   training the model, using model training data in conjunction with a machine learning (ML) algorithm, to generate a predictive value suggestive of a likelihood that a given sequence, if submitted, will result in an account action failure, the model training data generated based on the feature values and a set of labels assigned to the plurality of character sequences, and the predictive value generated based at least in part on rates of success associated with the one or more recent time periods, wherein one or more actions for preempting submission of the given sequence are selectively performed based on whether the generated predictive value is greater than a threshold.

2. The method of claim 1, wherein the account action includes at least one of retrieving information associated with the account, establishing a communication link with the account, executing a transaction using the account, or accessing an interface for managing the account.

3. The method of claim 1, wherein the set of features characterize the given sequence based on at least one of a number of submissions associated with the given sequence, a number of successful actions associated with the given sequence, a number of failed actions associated with the given sequence, a success ratio associated with the given sequence, or a failure ratio associated with the given sequence.

4. The method of claim 1, wherein:
each first portion is concatenated with at least a second portion of the character sequence, each first portion having a fixed number of characters;
each set of subsequences includes a number of subsequences equal to a number of characters in the second portion of the character sequence from which the subsequences were extracted;
each subsequence in each respective set of subsequences includes each character from the first portion of the character sequence from which the subsequence was extracted; and
each subsequence in each respective set of subsequences includes a different set of characters from the second portion of the character sequence from which the subsequence was extracted.

5. The method of claim 1, further comprising:
grouping identical ones of the extracted subsequences;
determining a number of submissions associated with each group; and
determining a number of failures associated with each group, wherein the feature values are determined based in part on the numbers of submissions and the numbers of failures.

6. The method of claim 1, wherein:
grouping the character sequences based on the first portions includes grouping ones of the character sequences sharing a same unique first portion;
extracting a set of trimmed subsequences from each respective group of character sequences includes, for each group of character sequences, extracting a set of subsequences including one subsequence equal to a second portion of the character sequence, and each of the trimmed subsequences excludes a different number of characters from the end of the sequence;
grouping ones of the trimmed subsequences includes grouping ones of the trimmed subsequences having a same number of trimmed characters;
determining the numbers of unique subsequences included in each group of trimmed subsequences wherein the feature values are determined based further in part on the numbers and the totals.

7. The method of claim 1, wherein each of the plurality of character sequences is labeled to indicate whether the account action failed.

8. The method of claim 1, wherein the ML algorithm incorporates one or more aspects of an xgboost model, and wherein the model is further trained to generate the predictive value in real-time with the given sequence being entered.

9. The method of claim 1, further comprising:
obtaining a set of validation sequences annotated to indicate at least one of whether an associated character sequence was submitted or whether an associated account action failed; and
further training the model, using the validation sequences in conjunction with one or more loss functions, to more accurately predict whether a sequence, if submitted, will result in an account action failure, the further training including optimizing one or more hyperparameters used in generating the predictive value.

10. A system for training a model to predict whether an account action will fail due to an invalid account identifier, the system comprising:
one or more processors; and
at least one memory coupled to the one or more processors and storing instructions that, when executed by the one or more processors, cause the system to perform operations including:
retrieving historical data including a plurality of character sequences each entered for identifying an account to be used in the account action, each character sequence including at least a first portion;
grouping the character sequences based on the first portions;
extracting a set of trimmed subsequences from each respective group of character sequences, each trimmed subsequence having a number of trimmed characters;
grouping ones of the trimmed subsequences based on the numbers of trimmed characters;
determining, for each first portion, for each group of trimmed subsequences, a ratio of a number of unique subsequences included in the group of trimmed subsequences to a total number of instances the corresponding first portion is used in the historical data;
determining, for each respective character sequence and each subsequence extracted from the respective character sequence, a feature value for each of a set of features defined for characterizing sequences, the determining based on the historical data, a number of characters included in at least one portion of the respective character sequence, the determined ratios, and sequences of characters submitted during one or more recent time periods during which the detected character sequence was submitted; and
training the model, using model training data in conjunction with a machine learning (ML) algorithm, to generate a predictive value suggestive of a likelihood that a given sequence, if submitted, will result in an account action failure, the model training data generated based on the feature values and a set of labels assigned to the plurality of character sequences, and the predictive value generated based at least in part on rates of success associated with the one or more recent time periods, wherein one or more actions for preempting submission of the given sequence are selectively performed based on whether the generated predictive value is greater than a threshold.

11. A method for using a model trained in conjunction with a machine learning (ML) algorithm to predict whether an account action will fail due to an invalid account identifier, the method performed by one or more processors of a validation system and comprising:
detecting a character sequence being entered for identifying an account to be used in the account action, the character sequence including at least a first portion;
grouping the character sequence based on the first portion;
extracting a set of trimmed subsequences from the group of character sequences, each trimmed subsequence having a number of trimmed characters;
grouping ones of the trimmed subsequences based on the numbers of trimmed characters;
determining, for the first portion, for each group of trimmed subsequences, a ratio of a number of unique subsequences included in the group of trimmed subsequences to a total number of instances the first portion is used in a set of historical data;
determining, for the character sequence and each trimmed subsequence extracted from the character sequence, a feature value for each of a predefined set of features for characterizing sequences, the determining based on a number of characters included in at least one portion of the character sequence, the determined ratios, and sequences of characters submitted during one or more recent time periods during which the detected character sequence was submitted;

generating, using the feature values as input to the model, a predictive value suggestive of a likelihood that the detected character sequence, if submitted, will result in the account action failing, the predictive value generated based at least in part on rates of success associated with the one or more recent time periods; and selectively performing a preemptive action for preempting submission of the character sequence based on whether the predictive value is greater than a threshold.

12. The method of claim 11, wherein the character sequence further includes at least a second portion, and wherein the first and second portions each represent a different attribute of the account.

13. The method of claim 12, wherein:
the account is of a particular type;
an order of the first and second portions maps to a hierarchy defined for accounts of the particular type;
a first portion of the character sequence maps to a top level of the hierarchy that is used for grouping ones of the accounts sharing a first attribute; and
a second portion of the character sequence maps to a bottom level of the hierarchy that is used for uniquely identifying accounts within the corresponding group.

14. The method of claim 13, wherein:
the particular type of the account is a phone number associated with a plurality of attributes;
the first attribute includes a concatenation of at least one of a country code associated with the phone number, an area code associated with the phone number, or an exchange code associated with the phone number;
a second attribute includes a concatenation of one or more remaining attributes associated with the phone number; and
the account action is establishing a communication link with the account.

15. The method of claim 11, further comprising:
determining a number of successes associated with a first time period of the one or more recent time periods, wherein at least one of the sequences of characters submitted during the first time period includes the detected character sequence; and
determining a number of successes associated with a second time period more recent than the first time period, wherein at least one of the sequences of characters submitted during the second time period includes the detected character sequence, and wherein the predictive value is adapted based at least in part on the number of successes associated with the first time period and the number of successes associated with the second time period.

16. The method of claim 11, wherein the ML algorithm incorporates one or more aspects of an xgboost model, and the predictive value is generated in real-time with the detected character sequence being entered.

17. The method of claim 11, further comprising:
annotating the character sequence based on at least one of whether the character sequence was submitted or whether the account action failed.

18. The method of claim 11, the selective performing including:
performing the preemptive action responsive to the predictive value being greater than the threshold; and
refraining from performing the preemptive action responsive to the predictive value not being greater than the threshold.

19. The method of claim 18, wherein the preemptive action includes at least one of:
generating a notification that the character sequence is likely invalid;
generating a suggestion to verify whether the character sequence is correct;
generating a request for a replacement character sequence; or
determining an initial position in the character sequence where an incorrect character was first entered, and generating an indication of the initial position.

* * * * *